ABSTRACT

United States Patent [19]
Jameson

[11] 3,777,792
[45] Dec. 11, 1973

[54] AUTOMATIC BED FRAME MACHINE
[76] Inventor: Paul Jameson, P.O. Box 465, Notus, Idaho 83656
[22] Filed: Aug. 14, 1972
[21] Appl. No.: 280,687

[52] U.S. Cl.............. 144/82, 144/154, 83/267, 144/2 R
[51] Int. Cl............................................. B27f 5/12
[58] Field of Search............... 144/154, 82, 136, 144/2, 3, 198, 200, 201, 133, 203; 83/267, 411 R, 733

[56] References Cited
UNITED STATES PATENTS
2,000,458  5/1935  Shipley ................... 144/154 X
2,948,897  8/1960  Sherwood ................. 144/154

Primary Examiner—Donald R. Schran
Attorney—John W. Kraft

[57] ABSTRACT

The bedframe machine includes a feed table, a rotary work fence, and a saw assembly. The rotary work fence and saw assembly are provided with a suitable drive subassembly to actuate the saw assembly and to actuate and position the rotary feed means.

4 Claims, 7 Drawing Figures

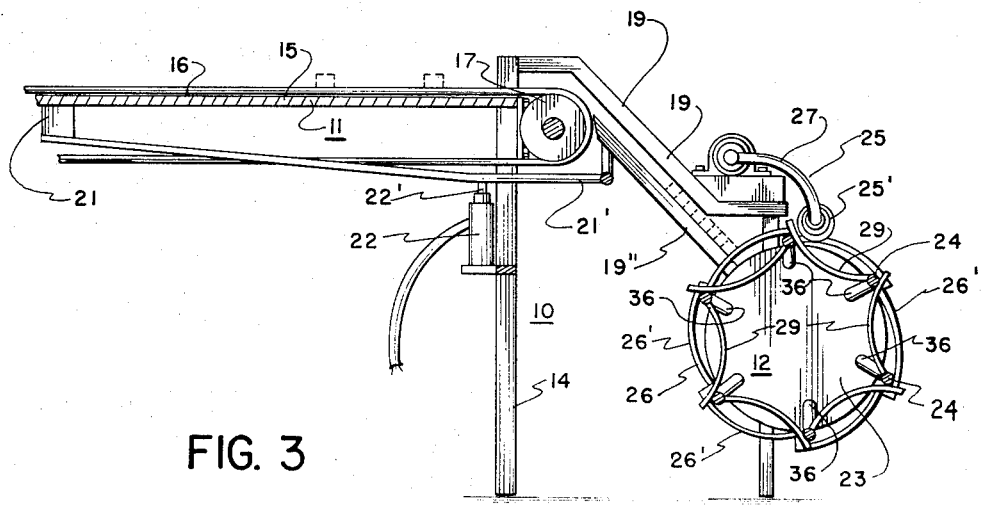
FIG. 3
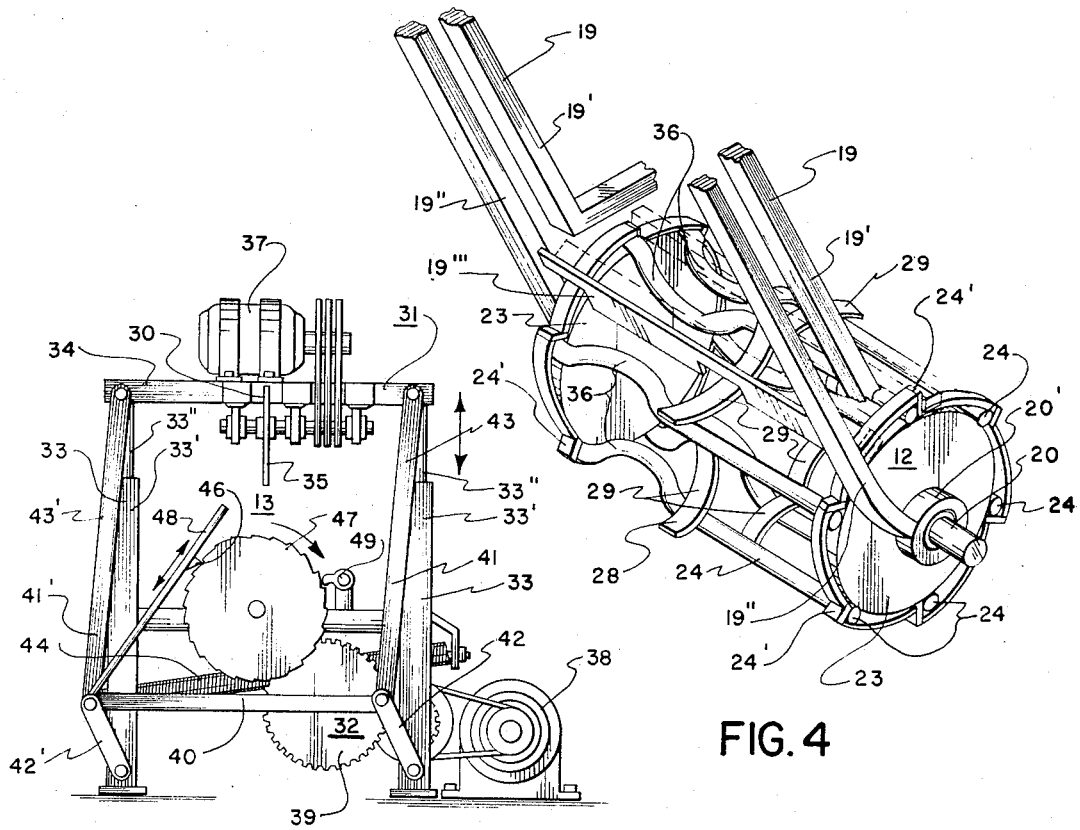
FIG. 5
FIG. 4

AUTOMATIC BED FRAME MACHINE

FIELD OF INVENTION

The present invention relates to mortise cutting apparatus and, more particularly, to automatic mortise cutting apparatus having a rotary work fence and feed means.

DESCRIPTION OF THE PRIOR ART

In making furniture, such as bedframes, it has been found to advantage to join structural members by means of mortise and tenon joints. Mortises are commonly cut by means of mortising chisels, or bits, having an auger-like cutting bit operable to ride within a suitably configured, stationary cutting chisel. In operation, mortising chisels disposed in a suitable drill press cut the square-like hole in the structural member. For cutting slots and the like, the structural member is moved relative to the mortising chisels, so that a plurality of mortises may be made adjacent to the first and subsequent mortises. For this reason, use of mortise joints has been restricted; and feeding means have been, likewise, restricted to manual positioning means.

Accordingly, it is an object of the present invention to provide mortise cutting means for structural bedframes and the like which are automatically positioned and cut.

It is a further object of this invention to provide feed means and fence positioning means in a rotary work fence.

It is another object of this invention to provide a suitable feed table to feed wood pieces to the cutting means and the rotary work fence thereof.

These and other objects shall become apparent from the description following, it being understood that modifications may be made without affecting the teachings of the invention here set out.

SUMMARY OF THE INVENTION

Generally, the bedframe machine includes a feed table, a rotary work fence, and a saw assembly. The rotary work fence and saw assembly are provided with a suitable drive subassembly to actuate the saw assembly and to actuate and position the rotary feed means.

A more thorough and comprehensive understanding may be had from the detailed description of the preferred embodiment when read in connection with the drawings forming a part of this specification.

BRIEF DESCRIPTION OF THE DRAWINGS:

FIG. 3 is a fragmentary side elevational view of the feed table and rotary work fence of this invention drawn to a larger scale, shown with bedframe legs in broken lines for illustrative purposes.

FIG. 4 is a fragmentary left rear perspective view of the work feed rack and rotary work fence of the FIG. 3, with bedframe legs shown in broken lines for illustrative purposes.

FIG. 5 is a side elevational view of the saw assembly and actuating subassembly of this invention.

Figure 1:
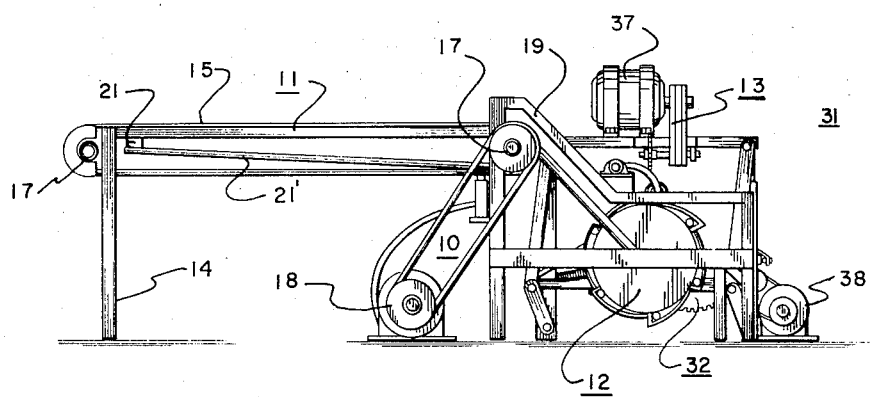
FIG. 1 is a side elevational view of the automatic bedframe machine of this invention.
Figure 2:
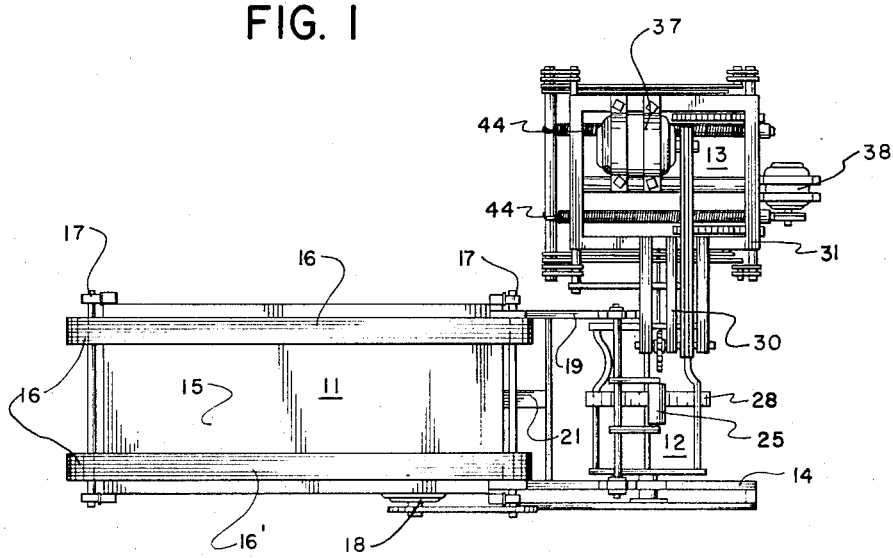
FIG. 2 is a top plan view of the apparatus of the FIG. 1.

DETAILED DESCRIPTION OF THE PREFERRED EMBODIMENT:

Referring now to the drawings and, more particularly, to the FIG. 1 and 2, the automatic bedframe machine, or mortise cutter, is shown to advantage and generally identified by the numeral 10. The automatic mortise cutter 10 includes a feed table 11, a rotary work fence 12, and a saw assembly 13. The feed table 11 is mounted in a suitable frame 14, and includes a decking 15 over which work pieces may pass. An actuating means, such as a belt actuator 16, is also included on the frame 14. The belt 16 rides rectilinearly about the table 11 and the decking 15 on idler rollers 17 which may be disposed at each of the terminal ends of the table 11. It has been found to advantage to dispose a pair of belts 16 and 16' along each of the terminal sides of the decking 15 to provide better feed alignment to the work pieces. The belt actuator 16 is driven by a motor and pulley 18. Work pieces carried on the table 11 are discharged into a work feed rack 19. As shown more clearly in the FIG. 3, the feed rack 19 comprises a pair of guides disposed parallel to the terminal sides of the table 11. Each of the guides of the rack 19 comprises a pair of downwardly inclined, parallelly disposed bars 19' and 19" disposed one above the other. The upper bar 19' is dependently fastened to suitable portions of the frame 14. The lower bars 19" are generally mounted at their lowermost terminal ends to a transversely disposed shaft portion 20 by suitable bearing means 20', the opposite ends being carried by the frame distally forward and below the table 11. The upper terminal ends of the bars 19" are pivoted on respective blocks 21 at the end opposite the bars 19" to the underside of the decking 15. A switch 22 operable to selectively activate the motor 18 is mounted to the frame 14, such that the plunger 22' of the switch 22 contacts the lowermost terminal side of the plate 21' distally from the rack 19. In operation, work pieces (shown in broken lines on the table 11) are discharged transversely into the rack 19. When the rack 19 has a preselected number of work pieces, the downward force of the pieces is operable to force the plate 21' to deflect sufficiently at its end opposite the block 21 to actuate the plunger 22' to stop the motor 18. Similarly, when the work pieces have been expended from the lower bars 19" of the rack 19, the plate 21' is permitted to deflect upwardly to activate the motor 18 to continue supply of work pieces.

Referring again to the FIGS. 1, 2, and 3, the rotary work fence 12 is disposed generally at the lowermost terminal end of the rack 19. As shown more clearly in the FIG. 4, the rotary work fence 12 includes a pair of wheels 23, each journally mounted to a portion of the frame 14, a plurality of transversely disposed bars 24 fastened equidistantly at intervals about the circumference of the wheel 23, and a work follower 25. A ratchet-like rim 26 is disposed about the wheels 23 and the bars 24. The rim 26 comprises a plurality of convexly curved portions 26', corresponding in number to the bars 24. Each convexly curved portion 26' has one of its terminal ends fastened to the circumference of the wheel 23 adjacent to one of the bars 24 and its terminal end opposite fastened to a next succeeding bar 24 which is distally forward of the preceding bar 24. The rim 26 also includes a plurality of upstanding portions 24', also corresponding in number to the bars 24, the upstanding portions 24' being perpendicularly disposed between the outermost circumferential surface of the wheels 23 and tangential terminal ends of the respective bars 24. That is to say the portions 24' are outwardly disposed at respective terminal ends of one of the convexly curved portions 26'. It is to be understood that the rim portions 26' and the upstanding portions 24' are parallelly disposed with respect to the wheels 23. The lower bars 19" of the rack 19 are provided with a horizontal guide portion 19''' distally disposed therebetween and above the respective lowermost terminal ends of the bars 19". The portion 19''' tends to guide work pieces (shown in broken lines for illustrative purposes) between the respective bars 19' and 19" of the rack 19 onto the rotary fence assembly 12. As shown in the FIG. 3, the work follower 25 includes a rollerlike work holding means 25' carried on an arm 27 which is pivotally mounted at one of its terminal ends to a suitable portion of the frame 14. The follower 25 is disposed centrally between the wheels 23, and rides on a camming track 28. The camming track 28 comprises a plurality of concavely curved cam bands 29 fastened at their terminal ends centrally on the bars 24. It may be readily seen that the horizontal portion of the upper rack bar 19', the leading edge of the standing portion 24' of the uppermost terminal side of the convexly curved portions 26', and the follower 25 provide a multiplicity of potential work piece retaining stations about the circumference of the wheels 23. In operation, the wheels 23 and the bars 24 are driven in a manner hereinafter later described in a forward direction of rotation with respect to the cutter assembly 10. The work pieces carried in the rack 19 are picked up and urged forwardly by the upstanding portions 24' of the ratchet-like rim 26. The wheels 23 are then stopped at a predetermined point of location, and the work piece is held at the uppermost terminal side of the geometric circle of the wheels 23 in one of the piece retaining stations described above. When the work piece has been mortised, the wheels 23 again rotate, causing another work piece to fall from the rack 19 onto the fence assembly 12, and the earlier work piece to rotate off of the wheels 23 by the follower 25 camming the track 28 away from the latter work piece, and again to the new piece in the manner of the first.

Figure 6:
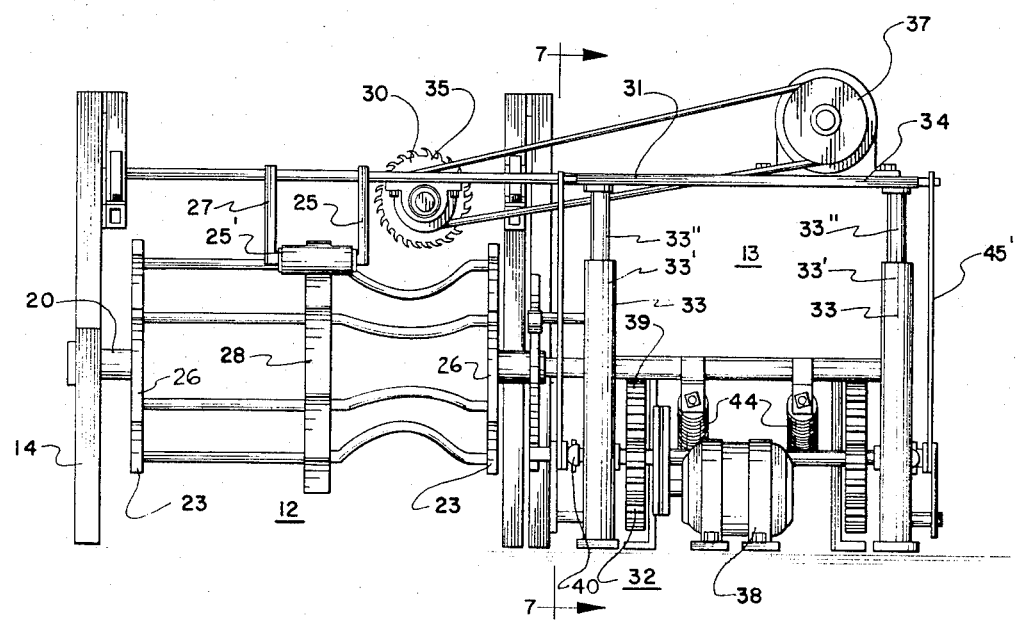
FIG. 6 is a front elevational view of the automatic bedframe machine showing the rotary work fence and saw assembly thereof.
Figure 7:
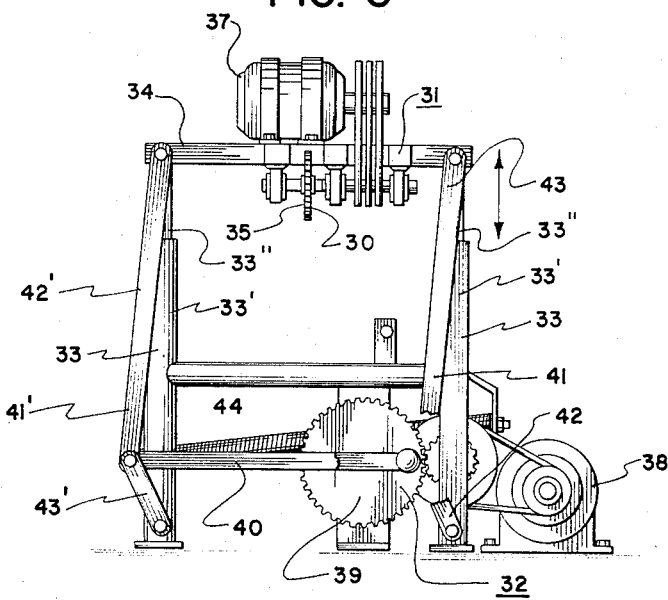
FIG. 7 is a cross-sectional side elevational view taken substantially along the lines 7—7 of the FIG. 6.

Referring again to the FIGS. 1 and 2, the saw assembly 13 includes a saw 30, a carriage 31, and a drive subassembly 32. The saw 30 is mounted on the carriage 31. As shown in the FIGS. 5 and 6, the carriage 31 includes upstanding cornerposts 33 and horizontally disposed rectilinear and transverse crossties 34. Each of the cornerposts 33 comprises an upstanding, fixedly mounted cylinder 33' and a slidable shaft 33" operable to closely ride, rectilinearly within the cylinder 33'. Each of the cylinders 33' may include urging means carried inside the cylinder 33' being operable to urge the shaft 33" from the cylinders 33'. The carriage crossties 34 are fastened at their terminal ends to the uppermost terminal ends of the shafts 33". The saw 30 is mounted on the crossties 34 to project its blade 35 over the rotary work fence 12 and transversely of the cutter 10. It has been found to advantage to provide a concavely cured portion 36 in the bars 24 to permit the mounting and drive portions of the saw 30 to pass unobstructed into the area of the fence 12. The saw 30 is driven by a motor 37 also mounted on the crossties 34 of the carriage 31.

The drive assembly 32 is operable to raise and lower the carriage 31 and to drive the wheels 23 of the rotary work fence 12. The drive subassembly is driven by a motor 38. The carriage actuating activity of the drive subassembly 12 is accomplished by a cam gear 39 mounted on a shaft (not shown) and a substantially horizontally disposed follower rod 40 pivotally fastened distally from one of its terminal ends to the face of the cam gear 39 and rectilinearly with the cutter 10 transversely with the carriage 31. The rod 40 is pivotally mounted at each of its terminal ends to a pair of upstanding carriage linkages 41 and 41'. Each of the linkages 41 and 41' are pivotally bifurcated distally from their respective lowermost terminal ends, and are pivotally fastened to the terminal ends of the rod 40 at the front and back pivot means. The lower portions 42 and 42' of the linkages 41 and 41' are pivotally fastened at their lowermost terminal ends to adjacent transverse cornerpost cylinders 33'. The upper portions 43 and 43' of the linkages 41 and 41' are pivotally fastened to the uppermost terminal end of the shaft 33".

In operation the motor 38 drives the cam gear 39 at a preselected speed, resulting in movement of the follower rod 40 in a rearward direction, and also resulting in a rearward movement of the linkages 41 and 41' at the bifurcated pivot means causing the linkages 41 and 41' to pull the shafts 33" into the cylinders 33'. As the cam gear 39 completes one full revolution, the rod 40 is moved forwardly, causing the portions 42, 42', 43 and 43' of the linkages 41 and 41' to return to alignment to return the shafts 33" and the carriage 31 to their normal extended position. It is to be understood that the urging means carried in the cylinders 33' are operable to urge the shafts 33" to extend upwardly, also tending to cause the portions 42, 42', 43 and 43' to come into alignment. It has been found to advantage to provide auxiliary springs 44 fastened between the cylinders 33' and the linkages 41 and 41'. Due to the mass of the carriage 31, the saw 30, and the motor 37, it has been found to advantage to provide a substantially identical pair of linkages 45 and 45' at the end opposite the linkages 41 and 41'.

The wheels 23 of the rotary work fence 12 are driven by a ratchet 46 and a sprocket 47 which is fastened to the rotatable shaft 20. The ratchet 46 is disposed on a ratchet rod 48 which is pivotally mounted at its end opposite the ratchet 46 to the bifurcated joint of the rearward linkage 41'. The ratchet 46 is operable to engage the suitable ratcheting teeth of the sprocket 47. In operation as the linkage 41 pivots at the bifurcation, the ratchet rod 48 is pulled rearwardly; and the ratchet 46 is drawn over one of the teeth of the sprocket 47. As the linkage 41' returns to alignment, the ratchet 46 of the rod 48 pushes with a generally upward force against one of the teeth of the sprocket 47 causing the sprocket 47 and the shaft 20 to rotate. It has been found to advantage to provide a pawl 49 which is operable to retain the sprocket 47 from rearward rotation as the ratchet 46 is drawn over one of the teeth, as set out above.

In operation, suitable work pieces are fed by the feed table 11 into the rack 19. The motor 38, driving the rotary work fence in the manner set out above, is operable to pick up a work piece and to retain it in a predetermined juxtaposition, as set out above. The motor 38 of the drive assembly 32 is subsequently operable to raise and then lower the carriage 31 having the saw 30. The saw 30, driven by the motor 37, is operable to cut a suitable mortise in the work piece held by the rotary work fence 12. The drive assembly 32 then permits the carriage 31 and the saw 30 to rise and the rotary work fence 12 to rotate, ejecting the work piece and picking up a new work piece as set out above.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An automatic bedframe machine comprising a rotary work fence including a pair of upstandingly, parallelly disposed wheels, each of said wheels journally mounted to the frame of said machine, a plurality of bars fastened parallelly at intervals between said wheels, each of said wheels having a rim, each of said rims having convexly curved portions each fastened at one of its ends to the circumferential edge of said wheel adjacent one of said bars and fastened at its end opposite to the next forwardly adjacent bar, a work follower having a roller-like holding means mounted on an arm pivotally mounted to said frame, and having a cam rack comprising concavely curved cam bands fastened at each of their terminal ends to said bars; and a saw assembly including a saw, a carriage having cornerposts each comprising a fixedly mounted, upstandingly disposed cylinder, a slidable shaft operable to ride within said cylinder and urging means operable to urge said shaft from said cylinder, said shaft being joined by rectilinear and transverse crossties, said saw being mounted transversely over said rotary work fence on said crossties, said saw assembly including a drive subassembly operable to raise and lower said carriage assembly and to controllably drive said rotary work fence.

2. The apparatus of claim 1 wherein said drive means includes pivotally joined bifurcated linkage pivotally fastened to said shaft and to said cylinder of one of said cornerposts, a suitably driven cam and a follower pivotally mounted to said bifurcated joint of said linkage, and said cam including a ratchet-like gear connected to said wheels of said rotary work fence and a ratchet rod pivotally mounted at said bifuracted joint being operable to drive said sprocket and said fence in a forward direction of rotation.

3. The apparatus of claim 1 including a feed table having a frame, a decking, a work piece actuator means, a rack operable to align and feed work pieces to said rotary work fence, said rack having a pair of guides fastened at the discharging terminal ends of said table, said guides being fastened parallel to the terminal sides of said table, each of said guides including a pair of downwardly inclined, parallelly disposed bars mounted one above the other, said table including a pivotally deflecting lower rack bar and an adjacently disposed switch to activate and turn off said actuator means when said lower rack bar is deflected.

4. The apparatus of claim 1 including concavely curved portions on said bars of said rotary work fence operable to receive said saw.

* * * * *